United States Patent [19]

Tkacenko

[11] 4,266,268

[45] May 5, 1981

[54] SWITCHING POWER SUPPLY HAVING ENERGY STORAGE INDUCTOR IN PRIMARY CIRCUIT OF OUTPUT TRANSFORMER

[76] Inventor: Nikola Tkacenko, 1378 Sage Hen Way, Sunnyvale, Calif. 94087

[21] Appl. No.: 32,504

[22] Filed: Apr. 23, 1979

[51] Int. Cl.³ .......................................... H02M 7/537
[52] U.S. Cl. ...................................... 363/49; 363/17; 363/97; 363/132
[58] Field of Search ....................... 363/17, 27, 28, 96, 363/97, 131, 132, 135, 136, 49

[56] References Cited

U.S. PATENT DOCUMENTS

| | | | |
|---|---|---|---|
| 3,406,327 | 10/1968 | Mapham et al. | 363/135 |
| 3,624,483 | 11/1971 | Genuit | 363/28 |
| 4,078,247 | 3/1978 | Albrecht | 363/96 |
| 4,143,414 | 3/1979 | Brewster et al. | 363/27 X |
| 4,190,883 | 2/1980 | Cowett, Jr. | 363/134 X |

Primary Examiner—William M. Shoop

Attorney, Agent, or Firm—Claude A. S. Hamrick

[57] ABSTRACT

A switching power supply including a rectifier for rectifying input AC line power to provide a source of DC voltage, an output transformer having a primary winding for receiving power from the DC source and a plurality of secondary output windings for providing a plurality of regulated output voltages, an inductor coupled to the primary winding of the output transformer for returning stored energy to the source during switching dead times, a control circuit for monitoring the magnitude of the source voltage and for generating first and second switching control signals, the duty cycle of which is directly related to the magnitude of the source voltage, switching transistors for alternately completing oppositely directed current paths from the source through the transformer primary and inductor to ground, and diodes for creating a uni-directional current path to the source for energy stored in the inductor.

11 Claims, 6 Drawing Figures

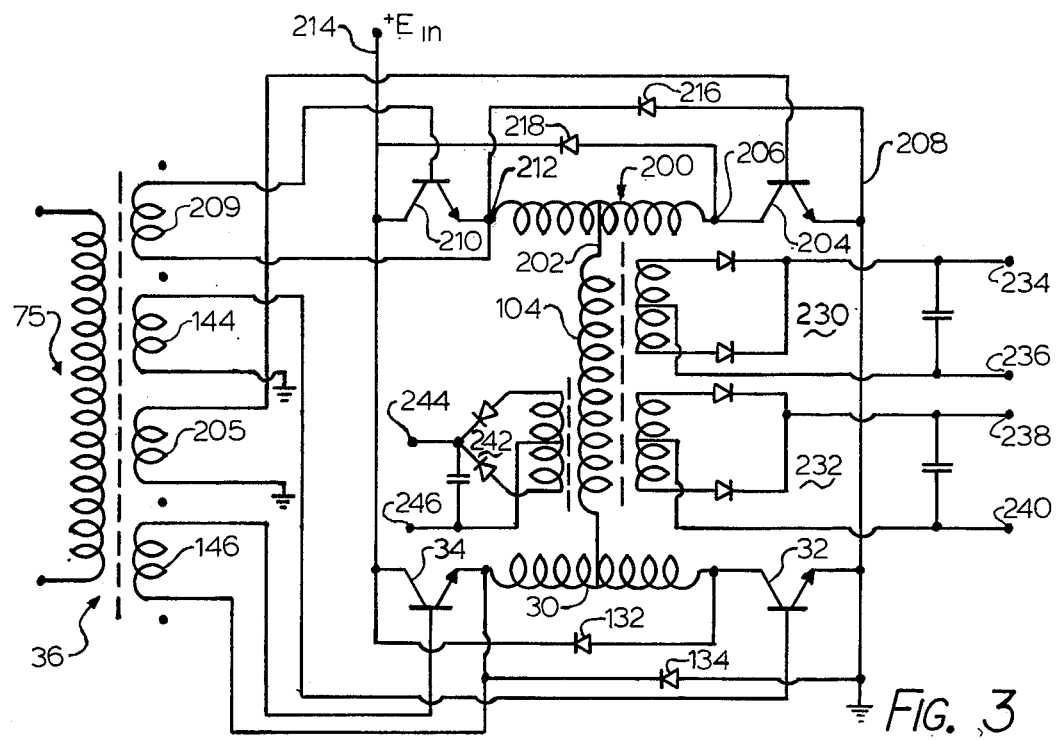
FIG. 3
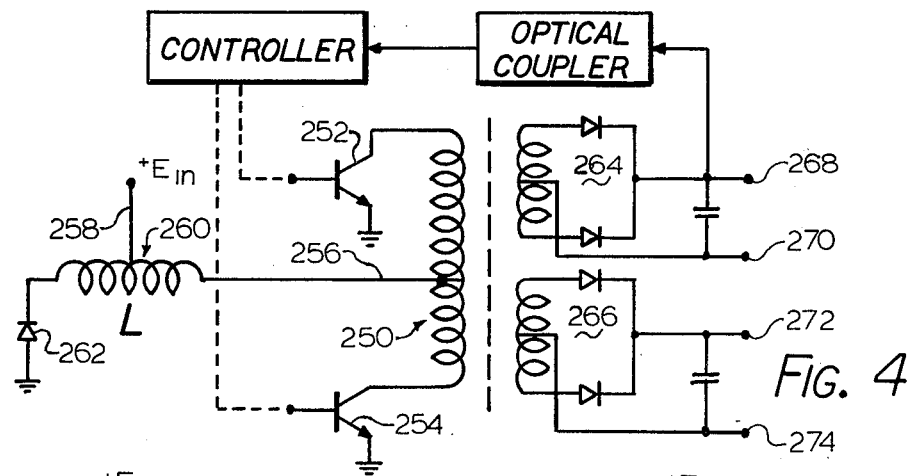
FIG. 4
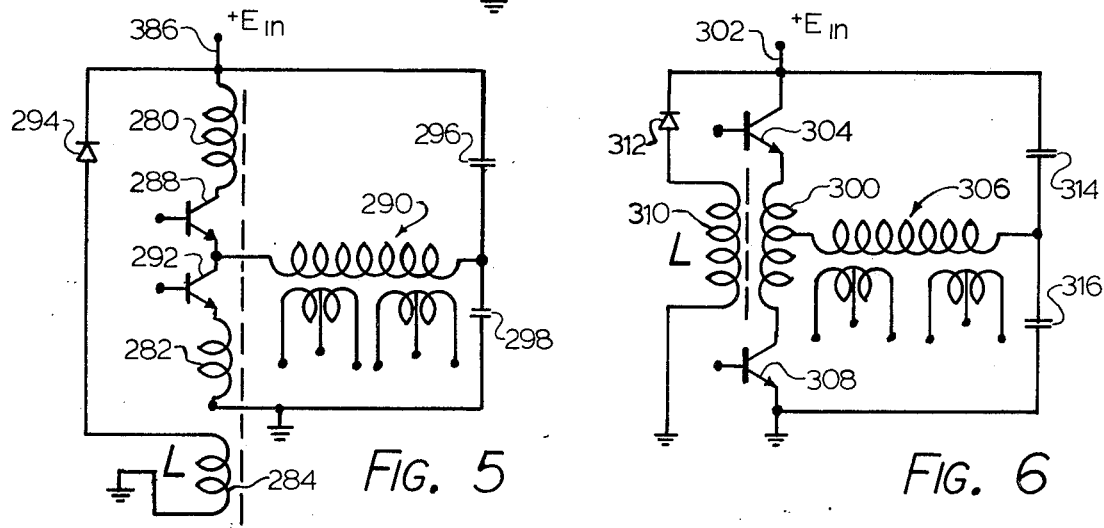
FIG. 5
FIG. 6

SWITCHING POWER SUPPLY HAVING ENERGY STORAGE INDUCTOR IN PRIMARY CIRCUIT OF OUTPUT TRANSFORMER

BACKGROUND OF THE INVENTION

1. Field of the Invention

The present invention relates generally to power supply devices and more particularly to a novel switching power supply apparatus having its energy storage component in the primary circuit of the output transformer rather than in the secondary circuits.

2. Description of the Prior Art

Although multiple output regulated power supplies have been available for many years, all such devices have suffered from disadvantages that from operational and efficiency standpoints must be overcome. For example, those supplies which utilize commonly driven but separate pulse-width modulated converters suffer the disadvantages that they are expensive, technically complex and not highly reliable; those devices which utilize a single pulse-width modulated converter having multiple secondaries have the disadvantages that auxiliary outputs have poor load regulation, a minimum load is required on the primary output and no auxiliary remote sensing is possible; those devices which utilize a single pulse-width modulated converter having multiple transformer secondaries with pass regulators, or which use multiple transformers with pass control in their primaries suffer from loss of efficiency and have minimum load requirements on the primary output; and those devices which utilize a front end chopper with a squarewave converter require an additional switching transistor, impose large stresses on the converter transistors, have poor auxiliary load regulation, have slow transient response and have low efficiency.

A more detailed description of these prior art approaches and their advantages and disadvantages may be found in an article entitled "Which Multiple Output Technique Should Your Switching Supply Use" by Walter J. Hirschberg, published in *EDN*, Mar. 5, 1978, pages 91-95.

SUMMARY OF THE PRESENT INVENTION

It is therefore an object of the present invention to provide an improved switching power supply apparatus having inductive energy storing means provided in the primary circuit of the output transformer rather than in the secondary circuit so as to avoid the necessity of providing inductors in each secondary output circuit.

Another object of the present invention is to provide a novel switching power supply apparatus, the output circuits of which are operationally independent of each other.

Still another object of the present invention is to provide an improved switching power supply apparatus having energy storage means provided in the primary winding circuit of the output transformer so as to optimize the operational speed of regulation.

Briefly, a preferred embodiment of the present invention includes a rectifier for rectifying input AC power to provide a source of DC voltage, an output transformer having a primary winding for receiving power from the DC source and a plurality of secondary output windings for providing a plurality of regulated output voltages, an inductor coupled to the primary winding of the output transformer for returning stored energy to the source during switching dead times, a control circuit for monitoring the magnitude of the source voltage and for generating first and second switching control signals, the duty cycle of which is directly related to the magnitude of the source voltage, switching transistors for alternately completing oppositely directed current paths from the source through the transformer primary and inductor to ground, and diodes for creating a unidirectional current path to the source for energy stored in the inductor.

An important advantage of the present invention is that no inductor devices are required in the regulated output circuits.

Another advantage of the present invention is that since all energy storage is accomplished on the primary side of the output transformer, the inductor can be designed to optimize the speed of regulation of the apparatus.

Another advantage of the present invention is that each of the transformer output circuits are independent of each other and thus need not include specific preloads.

These and other objects and advantages of the present invention will no doubt become apparent to those of ordinary skill in the art after having read the following detailed description of the preferred embodiment illustrated in the several figures of the drawing.

IN THE DRAWING

FIG. 3 is a circuit schematically illustrating the switching and output portions of a full bridge alternative embodiment of the present invention; and FIGS. 4, 5 and 6 schematically illustrate the switching and output portions of still other alternative embodiments of the present invention.

DETAILED DESCRIPTION OF THE PREFERRED EMBODIMENT

Figure 1:
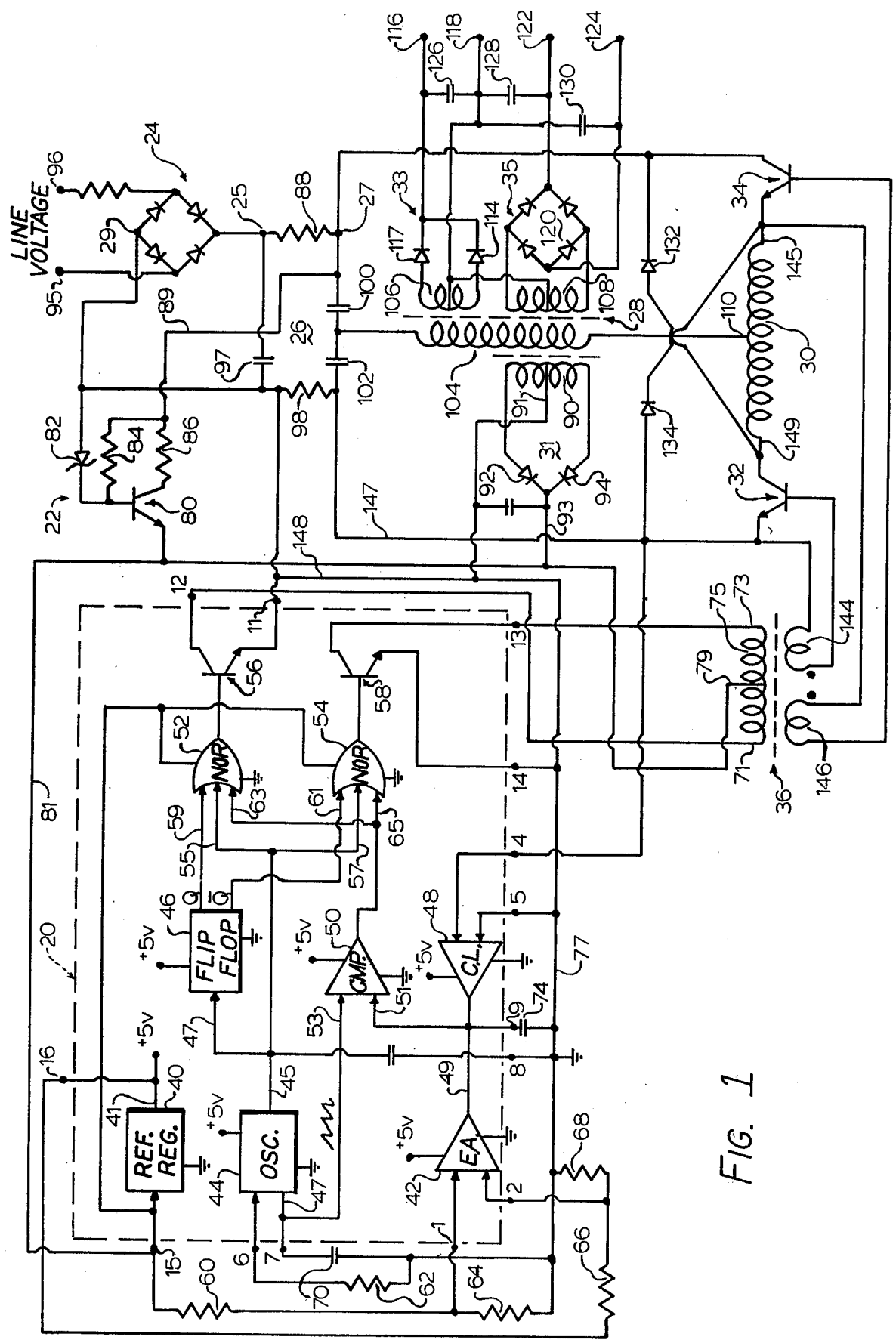
FIG. 1 is a diagram schematically illustrating a switching power supply apparatus in accordance with a preferred embodiment of the present invention.

Referring now to FIG. 1 of the drawing, there is shown a schematic diagram of a switching power supply in accordance with the present invention. As illustrated, the power supply includes a duty cycle controller 20, a start-up circuit 22, a line voltage rectifier 24, a filter network 26, an output transformer 28, a nonsaturable inductor 30, a pair of switching transistors 32 and 34, and a base drive transformer 36. In addition, the supply includes a transformer voltage detecting circuit 31, a 5-volt output developing circuit 33, and a ±12 volt output developing circuit 35.

The duty cycle controller 20 used in the preferred embodiment is a regulated pulse width modulator, Model Number SG1524, manufactured by Silicon General; a monolithic integrated circuit which contains all of the control circuitry required to regulate the subject power supply device. Included within a 16-pin, dual-in-line package indicated by the dashed lines 20 is a voltage reference regulator 40, an error amplifier 42, an oscillator 44, a pulse steering flip-flop 46, a current-limiting amplifier 48, a comparator 50, a pair of NOR gates 52 and 54, and a pair of output switching transistors 56 and 58.

In order to provide appropriate interaction with the power supplying circuitry, external resistors 60–68 and capacitors 70–74 are connected as illustrated. More specifically, resistors 60 and 64 provide a means for developing a power supply output following voltage at controller pin 15 for input to reference regulator 40, and for developing an appropriate division thereof for input to error amplifier 42 at pin 1; resistors 66 and 68 provide a means for developing a reference voltage for input to error amplifier 42 at pin 2; resistor 62 and capacitor 70 serve as frequency determining means for oscillator 44; and capacitor 74 filter out AC components of signals developed at pin 9.

Regulator 40 is energized by the voltage developed at pin 15 and in turn generates a 5-volt output at 41 which is used to energize elements 42, 44, 46, 48 and 50. NOR gates 52 and 54 are powered by the voltage input at pin 15. Oscillator 44 generates a train of brief pulses on line 45 and a sawtooth output at 47. In the preferred embodiment the values of resistor 62 and capacitor 70 are selected so that the operating frequency of the oscillator is 20,000 Hz.

Amplifier 42 compares the voltage input at pin 1 to the reference voltage input at pin 2 and develops a corresponding error signal on line 49. Flip-flop 46 responds to the pulses generated by oscillator 44 and develops complimentary outputs Q and $\overline{Q}$ which are respectively coupled to the NOR gate inputs 59 and 61. Comparator 50 compares the error signals developed by amplifier 42 to the ramp signals generated by oscillator 44 and generates pulses that are time related to the per-cycle relationship of the error signal to the ramp signal, and such pulses are simultaneously applied to the inputs 63 and 65 of NOR gates 52 and 54. The NOR gates in turn develop positive output pulses at the bases of transistors 56 and 58 when all of the inputs thereto are low. In response to the signals input thereto, transistors 56 and 58 alternatively couple the ends 71 and 73 of the primary winding 75 of the transformer 36 to ground line 77.

The start-up circuit 22 includes an NPN transistor 80, a zener diode 82 and a pair of resistors 84 and 86. Diode 82 and resistor 84 are connected across rectifier 24 via resistor 88 so as to initially develop a turn-on potential at the base of transistor 80 causing it to turn on and supply initial start-up power to controller pin 15. Diode 82 is selected to have a breakdown voltage less than the low limit voltage to be developed by the detector circuit 31, and as a result, the start-up circuit 22 plays no functional role following start-up of the device. By selecting a suitably large value for resistor 86, a low power transistor 80 can be utilized even though the circuit 22 is connected directly across the rectifier 24.

Line voltage AC, nominally 110 volts, is input at 96 and rectified by rectifier 24 to develop approximately 160-volt DC at point 25, and as referenced to circuit ground at 29. The high voltage side 25 is coupled through resistor 88 to the collector of NPN transistor 34 while the ground side 29 is coupled through a resistor 98 to the emitter of NPN transistor 32. The capacitors 100 and 102 are of relative small value; i.e., 10 µf, so as to provide a low impedance path to transformer primary 104 for the 20 kHz switched current. Capacitor 97 is of a relatively large value, i.e., 250 µf, so as to provide 120 Hz filtering as well as a DC storage means for avoiding power loss in the event of momentary line power interruptions.

One end of primary winding 104 is coupled to the junction of capacitors 100 and 102 while the other end is connected to a center tap 110 of inductor 30. In addition to the primary 104, output transformer 28 includes three secondary windings 90, 106 and 108. Secondary winding 90 has a center tap 91 connected to ground line 77, one winding end connected to line 93 through a rectifying diode 92 and the other end connected through a rectifying diode 94 to line 93. The purpose of this circuit is to provide a means for detecting a change in the output voltage of transformer 28 and relaying the detected signal to pin 15 of the controller 20 via line 81. Secondary winding 106 has its ends coupled through diodes 112 and 114 to an output terminal 116, and a center tap coupled to a common output terminal 118. In the preferred embodiment the number of turns in winding 106 is selected such that the voltage developed across terminals 116 and 118 is 5 volts. The ends of secondary winding 108 are coupled to output terminals 122 and 124 through the diodes shown at 120, and its center tap 121 is coupled to common terminal 118. The number of turns in winding 108 is selected so that $+12$ volts is developed between terminals 122 and 118, and $-12$ volts is developed between 124 and 118. Smoothing capacitors 126, 128 and 130 are respectively coupled across terminals 116–118, 118–122 and 118–124.

A first diode 132 is coupled across inductor 30 and transistor 34, and a second diode 134 is coupled across inductor 30 and transistor 32. These diodes provide a path through which the energy stored in inductor 30 can be returned to the source during the dead times of each switching cycle.

Base drive for transistors 32 and 34 is provided by the drive transformer 36. More specifically, a first secondary winding 144 is coupled across the base-emitter junction of transistor 32 while a second secondary winding 146 of transformer 36 is coupled across the base-emitter junction of transistor 34.

Overload protection of the circuit is provided by a small resistor, e.g., 0.2 ohm, which is inserted in the line 147 and connected across the controller pins 4 and 5. The voltage drop across this resistor is monitored by the current-limiting amplifier 48 of controller 20.

In operation, 110-volt AC line potential is applied across the power input terminal 95–96 of rectifier 24 and a DC voltage of approximately 160 volts is developed across its output nodes 25 and 29. This voltage immediately begins to charge the capacitor 97, and at the same time a voltage determined by diode 82 will be developed at the base of transistor 80 causing it to conduct and allow current to flow from rectifier node 25 through resistor 88, line 89, resistor 86, transistor 80, and through line 81 to pin 15 of controller 20 where it continues to flow to ground 77 through resistors 60 and 64. The resultant voltage developed at pin 15 will cause regulator 40 to generate a 5-volt output at pin 16 which will energize the controller components 44 through 50. Note that the voltage developed at pin 15 energizes the NOR gates 52 and 54.

As current flows from pin 16 through resistors 66 and 68 to ground 77, a reference voltage is developed at pin 2 which is input to error amplifier 42, and since pin 1 will initially be at a low voltage lower than that at pin 2, error amplifier 42 will generate an error signal at pin 9 which charges capacitor 74 and develops a voltage thereacross which is applied to the input 51 of comparator 50 and causes it to produce its widest output pulses. At the same time that this operation is occurring, oscillator 44 begins to operate at a frequency determined by resistor 62 and capacitor 70, and develops a sawtoothed output on pin 7 which is applied to input 53 of comparator 50. Oscillator 44 also develops a train of narrow pulses at its output 45 (pin 3) which are applied to the input 47 of flip-flop 46 as well as to the inputs 55 and 57 of NOR gates 52 and 54, respectively.

Figure 2:
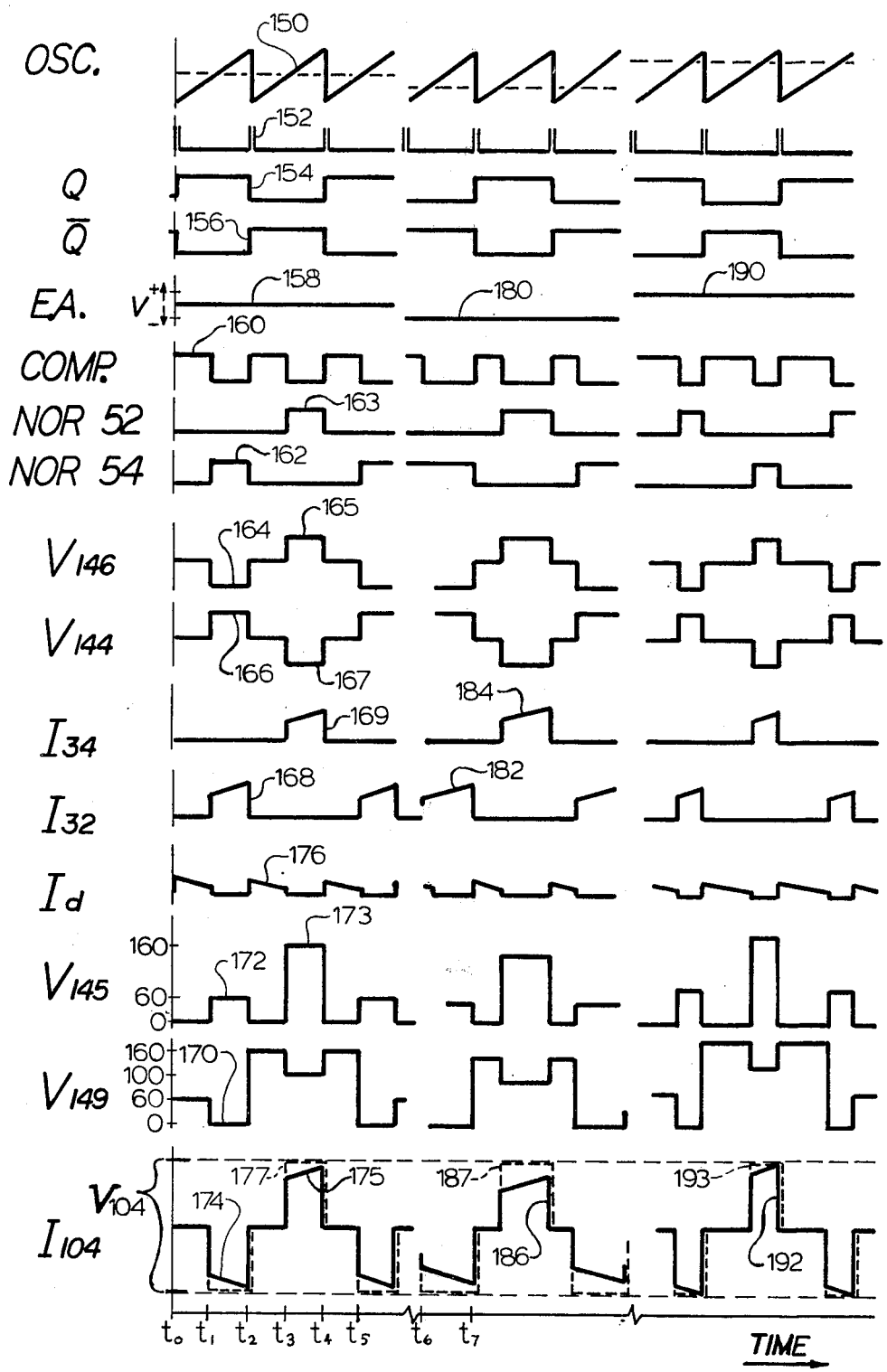
FIG. 2 is a timing diagram illustrating operation of the apparatus shown in FIG. 1.

Referring now additionally to FIG. 2 of the drawing, the signals developed by oscillator 44 are illustrated at 150 and 152. The pulses input to flip-flop 46 cause complimentary Q and $\overline{Q}$ outputs to be developed, as indicated at 154 and 156, for input to NOR gates 52 and 54 at 59 and 61, respectively. In response thereto the NOR gates cause transistors 56 and 58 to alternatingly be turned on and off for the durations of the pulses input thereto from comparator 50 thereby supplying current from the emitter of transistor 80 to drive transformer 36. This will result in the alternating application of turn-on pulses to switching transistors 32 and 34 causing current to flow from rectifier 24 through inductor 30 and transformer primary 104. As a result, current will be induced in the secondary winding 90 giving rise to a voltage at 93 which is fed via line 81 to controller pin 15 and control begins.

The preferred embodiment is designed to operate at a 50% duty cycle at the lowest expected line voltage, e.g., 95 volts AC where nominal line voltage is 117 volts AC. This is to say that when the output of the rectifier 24 is at the lowest voltage at which the converter still regulates, the transistors 32 and 34 will be conductive for one-half the duration of each switching cycle. On the other hand, if the rectifier voltage rises above its lowest value, the changes will be detected by the detector circuit 31, and in response to the output thereof, controller 20 will decrease the duty cycle of the switches 30 and 34 to that required to hold the energy input to primary 104 constant.

More specifically, the control system will stabilize with the voltage developed at 93 being approximately 15 volts. Since this voltage is applied to the emitter of transistor 80 and is higher than the 12 volts developed across the zener 82, transistor 80 will of course be back-biased and turned off, and consequently the start-up circuit 22 will cease to function. A 15-volt input applied to pin 15 of controller 20 will cause a voltage to be developed at pin 1 which is at a level so as to cause error amplifier 42 to produce an output 158 (FIG. 2) which is equal to approximately one-half the highest value of the ramped output of oscillator 44, and when compared thereto will cause comparator 50 to develop a positive output for approximately the first one-half of each oscillator cycle and a zero value for the remainder of each cycle, as shown at 160. As indicated above, this output is coupled into the NOR gates 52 and 54 at 63 and 65, respectively.

At any time that all of the three inputs to one of the NOR gates are low, an output will be developed by the gate which will turn on the corresponding one of the transistors 56 and 58. For example, if at $t_o$ the output of comparator 50 is high and then goes low at $t_1$, if the Q output of flip-flop 46 is high and the $\overline{Q}$ output is low, the output of NOR gate 54 will go high as indicated at 162, causing transistor 58 to conduct and couple the right half 75 of drive transformer 36 to circuit ground line 77. Since the center tap 79 of transformer 36 is initially energized by starting circuit 22 and later by the voltage developed on line 93, the connection of winding end 73 to ground will cause a current to flow through the primary half 73. This will induce a positive-going voltage across secondary 144 and a negative-going voltage across secondary 146 as illustrated at 164 and 166 in FIG. 2. Although the pulse 164 has no effect on transistor 34, the positive-going pulse 166 will cause transistor 32 to turn on and pull the end 149 of inductor 30 toward ground via line 147, resistor 98 and line 148.

With transistor 32 conducting, it can be seen that a certain amount of the energy previously stored in capacitors 100 and 102 will be discharged to ground through primary 104, the left one-half of inductor 30, transistor 32 and resistor 98. This will cause a current to flow through transistor 32 as indicated at 168. Note that as the collector of transistor 32, i.e., inductor winding end 149, is pulled to ground, as indicated at 170, the current flow through inductor 30 causes the emitter of transistor 34, i.e., winding end 145, to rise to approximately 60 volts as indicated at 172. The negative-going current through primary 104 is illustrated at 174.

At the end of the oscillator cycle, i.e., time $t_2$, the output of comparator 50 will go high, causing the output of NOR gate 54 to return to zero turning off transistor 58 and ultimately transistor 32. However, since current flow through the inductor 30 cannot be immediately interrupted and since the diodes 132 and 134 provide a current path back to the source 24, the energy stored in inductor 30 will be returned during the dead time to the source capacitor 97 through diodes 132 and 134. The diode current is illustrated at 176. During the next oscillator cycle the ranged output of oscillator 44 will at $t_3$ again rise to value equal to the output of amplifier 42 and as a result the comparator output will again be driven low. During this cycle, however, $\overline{Q}$ is high and Q is low, and consequently NOR gate 52 will be caused to develop a high output which will turn on transistor 56. This will cause current to flow from the rectifier 31 through the other half of drive transformer primary 75, thereby causing a negative voltage to be developed across secondary winding 144 as indicated at 167 and a positive voltage to be developed across secondary winding 146 as illustrated at 165. This will cause transistor 34 to conduct and pull the end 145 of inductor 30 up to approximately 160 volts, as indicated at 173, and as a result cause current to flow up through the primary 104 of transformer 28 as indicated at 175.

At the end of the cycle, i.e., at $t_4$, Q will again go high, $\overline{Q}$ will again go low and the output of comparator 50 will again go high causing transistor 56 and thus transistor 34 to be turned off. And, as occurred during the preceding dead period, the energy stored in inductor 30 will be returned to capacitor 97 via diodes 132 and 134. At $t_5$ the output of comparator 50 will again go low causing transistor 32 and conduct, etc.

Note that as illustrated at 174 and 175, during periods when the output of rectifier 24 is at its nominal voltage, current will flow through transformer 28 during approximately one-half of the total time of each cycle. However, should the rectifier output voltage level decrease, as for example due to a drip in line voltage, the voltage developed at 93 will decrease and the input to error amplifier 42 will decrease causing its output to decrease as illustrated at 180. This will cause the output of comparator 50 to go low earlier in the cycle, as for example at $t_7$, thus causing the duty cycle of transistors 32 and 34 to increase as illustrated at 182 and 184, and increase the time that energy is supplied to the output transformer during each switching cycle, as illustrated at 186.

Conversely, should the rectifier output level increase and cause the output of amplifier 42 to increase, as shown at 190, the duty cycle of transistors 32 and 34 will be decreased so as to decrease the time that energy is supplied to transformer 30 during each cycle, as shown at 192. Note, however, that as indicated by the dashed lines 177, 187 and 193, the peak-to-peak voltage $V_{104}$ across primary winding 104 is held constant over the range of regulation even though the peak current level and duty cycle changes.

Referring now to FIG. 3 of the drawing, a first alternative embodiment of the switching circuit and output transformer section of the present invention is shown. In this embodiment, in addition to the switching transistors 32 and 34, the transformer primary 104 and the diodes 132 and 134 which were included in the embodiment of FIG. 1, there is an additional inductor winding having a center tap 202 connected to the top end of winding 104, a third transistor 204 which couples the end 206 of inductor winding 200 to circuit ground line 208, a fourth transistor 210 which couples the other end 212 of winding 200 to the voltage source input at 214, and diodes 216 and 218 which provide a return path to the source for energy stored in winding 200. Moreover, the drive transformer 36 is also provided with an extra pair of secondary windings 205 and 209 which are respectively connected across the base-emitter junctions of the transistors 204 and 210. Note that in this embodiment the secondaries 144 are wound so as to simultaneously drive transistors 32 and 210 conductive during a positive-going input to primary 75, and to simultaneously drive transistors 34 and 204 conductive during a negative-going input to primary 75.

A pair of simplified output circuits are illustrated at 230 and 232 for developing output voltages across the terminals 234-236 and 238-240, respectively. A third output circuit 242 is also shown as a means for providing a voltage sensing output across the terminals 244-246.

Operation of this circuit is identical to that previously described relative to FIG. 1 except that during one switching period current flows from terminal 214 through transistor 210, through the left half of inductor 200, through primary 104, through the right half of inductor 30 and through transistor 32 to circuit ground, and during the other switching period current flows from source terminal 214 through transistor 34, through the left half of inductor 30, through primary 104, through the right half of inductor 200, and through transistor 204 to circuit ground. As a result this full bridge configuration, when using transistors which are current rated identical to the transistors of the FIG. 1 embodiment, allows twice the output power to be developed by the output transformer. It will be appreciated that even though the inducators 30 and 200 are shown as individual windings, they could also be wrapped about a single core.

In FIG. 4 of the drawing, another alternative embodiment of the present invention is illustrated wherein the output transformer primary winding 250 has one end coupled to circuit ground through a first switching transistor 252, its other end coupled to circuit ground through a second switching transistor 254, and a center tap 256 coupled to power input terminal 258 through one half of an inductor winding 260. The opposite end of inductor winding 260 is coupled to ground through a diode 262 so as to provide a return path to the source terminal 258 for energy stored in inductor 260. Secondary output circuits 264 and 266 develop output power across the terminals 268-270 and 272-274.

In addition in this embodiment an optical coupler 276 is illustrated as a means for monitoring the voltage output by circuit 264 and for supplying a responsive signal to controller 278 which in turn controls the duty cycle of the switching transistors 252 and 254. This alternative control loop could likewise be used in any of the embodiments disclosed herein.

Further alternative embodiments of switching circuits in accordance with the present invention are partially illustrated in FIGS. 5 and 6. In FIG. 5, three inductor windings 280, 282 and 284 are wound upon a common core such that the winding 280 provides a current path from power source terminal 286 through switching transistor 288 to one end of an output transformer primary 290, the inductor winding 282 provides a current path from primary 290 through transistor 292 to circuit ground, and the inductor winding 284 provides an energy return path from circuit ground through diode 294 to the source terminal 286. As in the embodiment of FIG. 1, capacitors 296 and 298 provide AC current paths through transformer primary 290.

In FIG. 6 the upper half of a center tapped inductor 300 provides a current path from source terminal 302 through switching transistor 304 to output transformer primary winding 306, and the lower half thereof provides a current path from winding 306 through transistor 308 to circuit ground. A second inductor winding 310 is wound about the same core as winding 300 and provides a means for returning energy stored in inductor 300 to source terminal 302 via diode 312. Capacitors 314 and 316 provide AC current paths to the other end of output transformer primary 306.

Although for simplicity voltage monitoring secondary circuits have not been shown in the embodiments of FIGS. 4, 5 and 6, it will be appreciated that such circuits will also be included. Moreover, it will be appreciated that the number of secondary output transformer windings and circuit configurations therefor are not limited either in number or in design to those illustrated.

Among the many advantages of the present invention are that (1) it uses a single energy storage inductor in the transformer primary circuit instead of requiring one inductor in each output circuit; therefore, the size and cost of the power supply may be substantially reduced; (2) it allows the transient response characteristic to be optimized for a given minimum total output load due to the use of a single inductor; and (3) it makes possible the provision of a multiple output, switching power supply having an operational efficiency which approaches that of a single output power supply.

It is contemplated that after having read the above disclosure numerous modifications and alterations of the present invention may become apparent to those of ordinary skill in the art, and it is therefore intended that the appended claims be interpreted as covering all such alterations and modifications as fall within the true spirit and scope of the invention.

What is claimed is:

1. A switching power supply apparatus comprising:
 means forming first and second terminals;
 means providing a source of DC voltage across said first and second terminals;
 output transformer means having a primary winding and a plurality of secondary output windings magnetically coupled to said primary winding;
 inductor means including a first inductor having a first winding portion, a second winding portion inductively coupled to said first winding portion and a center tap connected to one end of said primary winding;

first impedance means coupling the other end of said primary winding to said first terminal;

second impedance means coupling said other end of said primary winding to said second terminal;

control means for monitoring the magnitude of said DC voltage and for generating first and second switching control signals including first and second control pulses respectively, the duty cycle of which is directly related to the magnitude of said DC voltage;

first switching means including a first transistor responsive to said first control signal and operative to complete a current flow path for the duration of said first control pulse from said first terminal through said first portion of said inductor means, said center tap, said primary winding, and said second impedance means to said second terminal;

second switching means including a second transistor responsive to said second control signal and operative to complete a current flow path for the duration of said second control pulse from said first terminal through said first impedance means, said primary winding, said center tap and said second inductive portion of said inductor means to said second terminal; and diode means for creating a uni-directional current path from said second terminal through at least a portion of said first inductor to said first terminal so that when neither said first nor said second switching means is conductive, energy stored in said inductor means is returned to said source of DC voltage.

2. A switching power supply apparatus as recited in claim 1 wherein said first impedance means includes a first capacitor and said second impedance means includes a second capacitor.

3. A switching power supply apparatus as recited in claim 1 wherein said inductor means further includes a second inductor having another center tap connected to said other end of said primary winding, said second inductor having a third winding portion forming said first impedance means and a fourth winding portion forming said second impedance means, and wherein said first switching means further includes a third transistor responsive to said first control signal and connected between said third winding portion and said second terminal, and said second switching means further includes a fourth transistor responsive to said second control signal and connected between said fourth winding portion and said first terminal.

4. A switching power supply apparatus as recited in claim 3 wherein said diode means also creates a uni-directional current path from said second terminal through at least a portion of said second inductor to said first terminal so that when neither said first nor said second switching means is conductive, energy stored in said second inductor is also returned to said source of DC voltage.

5. A switching power supply apparatus as recited in claim 1 wherein said first winding portion has one end connected to said first terminal and a second end connected to said first switching means, said second winding portion has one end connected to said second switching means and another end connected to said second terminal, and wherein said first inductor also has a third winding portion magnetically coupled to said first and second winding portions and said third winding portion has one end connected to said second terminal and another end connected to said first terminal through said diode means, said first and second switching means being operable to alternately connect one end of said primary winding to said center tap.

6. A switching power supply apparatus as recited in claim 1 wherein said first inductor further includes a third winding portion inductively coupled to said first and second winding portions and having one end connected to said second terminal and a second end connected to said first terminal through said diode means.

7. A switching power supply apparatus as recited in claims 1, 2, 4, 5, or 6 wherein said control means includes a rectifier circuit coupled to one of said secondary windings for developing an output voltage which is simultaneously used to power the control means and to provide an indication of the output voltage of said rectifier means.

8. A switching power supply apparatus as recited in claim 7 and further comprising a start-up circuit means which is connected across said first and second terminals and develops a start-up voltage for initially powering said control means but which ceases to function when the rectifier circuit develops an output voltage which exceeds its start-up voltage.

9. A switching power supply apparatus as recited in claim 8 wherein said start-up circuit means includes a transistor having a first electrode coupled to said first terminal, a second electrode coupled to an input of the control means and a third electrode, zener diode means coupling said third electrode to said first terminal, and resistive means coupling said third electrode to said first terminal.

10. A switching power supply apparatus as recited in claims 1, 2, 4, 5, or 6 wherein said control means includes a rectifier circuit coupled to one of said secondary windings for developing an output voltage which is used to power the control means.

11. A switching power supply apparatus as recited in claim 10 wherein said control means further includes another rectifier circuit coupled to another one of said secondary windings for developing an output voltage which is used to provide an indication of the output voltage of said rectifier means.

* * * * *